Aug. 15, 1967  M. H. ROMAN  3,335,705
LEUCOCYTE INDICATOR
Filed Jan. 3, 1966

INVENTOR.
MICHAEL H. ROMAN.
BY
ATTORNEY

United States Patent Office 3,335,705
Patented Aug. 15, 1967

3,335,705
LEUCOCYTE INDICATOR
Michael H. Roman, 18 Eugene St.,
Lowville, N.Y. 13367
Filed Jan. 3, 1966, Ser. No. 518,125
4 Claims. (Cl. 119—14.05)

ABSTRACT OF THE DISCLOSURE

Apparatus for indicating excessive leucocyte count in milk comprising an elongate graduate adapted to receive a quantity of milk drawn through a test aperture having a filter disk, adapted to be blocked by fouling of the disk. Upon blockage, observation of the actual quality of milk drawn into the graduate before blockage provides an indicator of the leucocyte count.

---

This invention relates to milk testing, and more particularly to handy apparatus for determining the source especially the individual cows which are contributing to high leucocyte count or level in milk samples.

Normal milk produced by cows with healthy udders and at the proper stage of lactation is generally low in leucocyte count. On the other hand, abnormal milk produced from udders of cows with infected or injured udders or when very early or late in lactation is most generally high in leucocyte count or level. A concern for public health requires that milk intended for market must be produced clean and come from healthy udders as evidenced by low leucocyte levels in the milk. Milk from infected or diseased udders may not only be unpalatable but also may contain toxins and pathogenic bacteria which if not destroyed by pasteurization would be harmful to man. Further, unless udder infections are detected and controlled, spread of the infection may take place through the herd.

The testing of milk for sediment and other foreign and objectional material to determine its fitness for market by passing a prescribed quantity through a prescribed area of a sediment test disk of white dense cotton fiber filter material has been a common practice. More often than not, such tests are made in respect to milk contained in storage tanks or coolers, that represent milk from a large number of cows. The milk in such tanks or coolers is also subjected to further tests to determine the leucocyte count or level in the milk in order to ascertain its fitness for food. However, where a large herd of cattle is involved, a small percentage of the herd may be in need of treatment or elimination, because of giving of milk with high leucocyte count, while the bulk product from the entire herd will only indicate the average. The elimination or treatment of specific cows having abnormalities resulting in high leucocyte counts would be highly desirable. However, the methods for determining leucocyte counts or levels by laboratory or chemical tests for each and every cow in the herd would not be practical for the average dairyman and requires the services of trained professional person such as a laboratory technician or a veterinarian.

It has been found that there exists a very good correlation between the quantity of freshly milked milk which will pass through a standard sediment test disk and the actual leucocyte count of the milk so this invention is directed toward this end.

The present invention is directed to apparatus that can be readily employed by dairymen at the source of milk to single out the individual cows of a herd that are sources of milk having a high leucocyte count. The apparatus is easy to handle, and employs the standard sediment test disks, and may serve to provide information as to sediment and foreign matter as well as to single out the cows giving milk with a high leucocyte count. More particularly the apparatus comprises a graduate adapted to hold a quantity of milk in excess of a pint, a dump valve, to save the milk subjected to test, vacuum apparatus for drawing a specimen of milk through a sediment test disk, whereby evidence of milk having a high leucocyte count is obtained. The presence of a high leucocyte count in milk is manifested on the test disk by presence of slimy foreign matter, clots, shreds or blood specks, wherein the leucocytes are present. When the leucocyte count is abnormally high, it has been found that after the passage of a certain quantity of milk through the sediment test disk, the accompanying slime, clots or pus fouls the disk, and renders it impenetrable. In attempting to draw one pint of milk through a standard sediment test disk, by a vacuum of about fifteen inches of mercury, the presence of a high leucocyte count will be made manifest by plugging of the disk before a full pint can be drawn through the disk. For example, it has been found that if only a fourth of a pint of milk can be drawn through the disk, before the disk is plugged, the leucocyte count may run into many millions per milliliter. The flow of milk through the disk is stopped by the accumulation of slime and pus within a few seconds and the stoppage indicates the presence of a high and undesirable leucocyte count. By employing the apparatus in connection with the freshly produced and warm milk of each cow, before placing the milk in bulk storage, the dairyman may quickly single out the source of leucocytes and eliminate the cow from the milking herd, and treat the cow and cure the cause, as well as determine the cleanliness of production.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

Figures 1, 2, 3, 4:
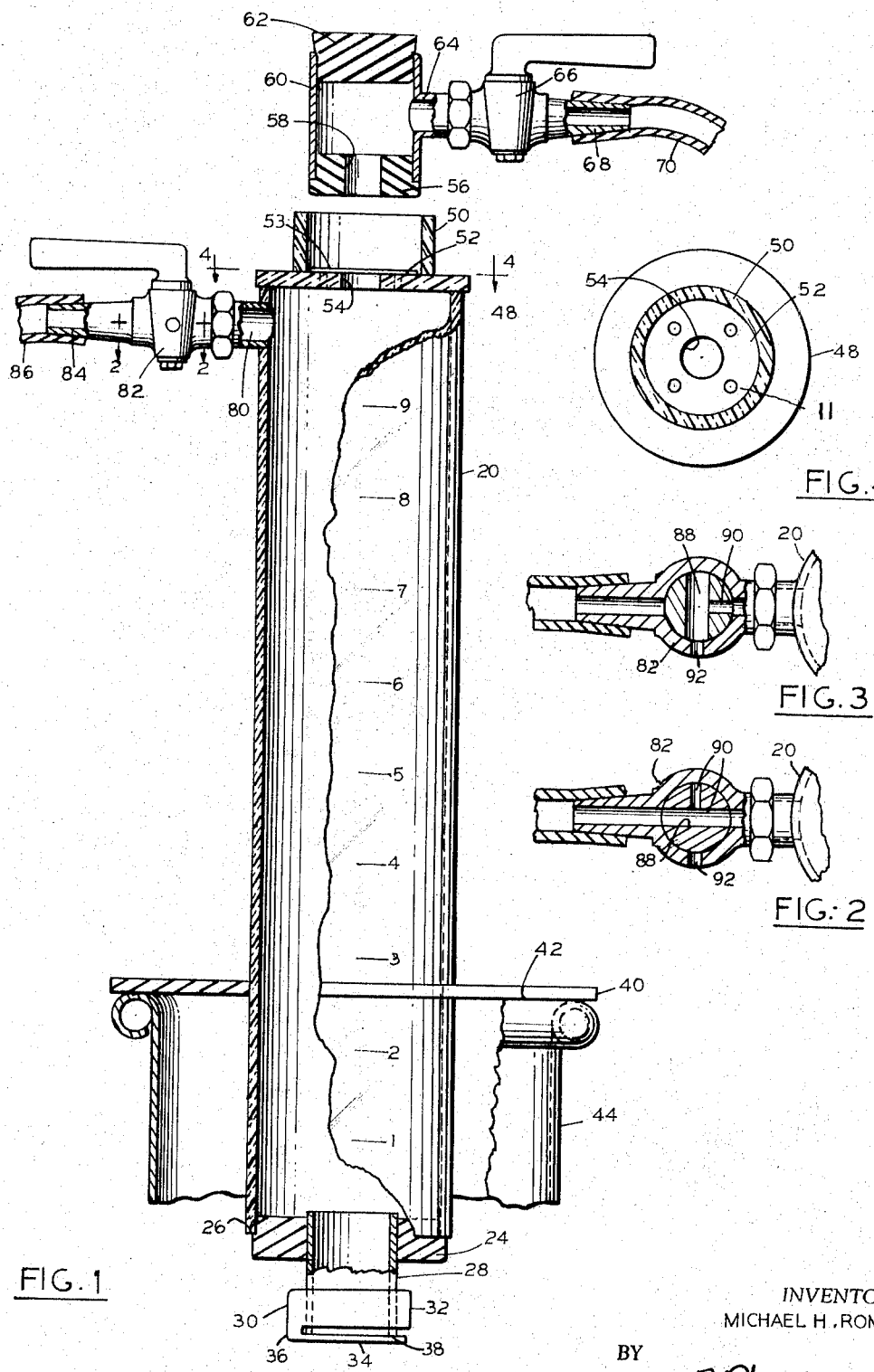
FIGURE 1 is a side elevation of the apparatus, with portions broken away.
FIGURE 2 is a sectional view through the vacuum valve in vacuum on position, taken on the line 2—2 of FIGURE 1.
FIGURE 3 is a sectional view of the vacuum valve in the vacuum off, and air bleed position.
FIGURE 4 is a sectional view taken on the line 4—4 of FIGURE 1.

Referring to the drawings, there is shown a tubular member or graduate 20, which may be of clear transparent heavy plastic, glass or the like, having a substantially uniform internal bore, and a capacity preferably somewhat in excess of a pint. In practice the internal diameter may be about two inches and the length of the tube ten and one half inches. Along the length of tube are graduations 1–9 arranged at even inches from the lower end of the tube. The lower end of the tube is fitted with a relatively thick rubber disk 24 having a shoulder 26 for engaging the lower end of the tube. Extending centrally through the center of the disk 24 is a tube 28 of stainless steel or the like, the lower end of which extends below the disk and is fittted with a rubber flap valve 30, the rubber flap valve comprising a collar portion 32, a flap valve 34 integrally and resiliently hinged to the collar along one side as at 36, and adapted to be sucked against the lower end 38 of the tube 28, which constitutes a valve seat.

Part way up the length of the tube is a support flange or ring which is affixed to the tube. The diameter of the flange or ring 40 is sufficient to conveniently rest upon the upper end of the neck of a milk can 44, or other receptacle.

The upper end of the tube 20 is closed off by a circular or square plate 48, having an upstanding tubular socket or sleeve 50, surrounding a filter disk seat 52 having a standard test aperture 54 of 0.40 inch diameter. The seat may, if desired, have several small ports 11 arranged on a circle around the aperture to assist in holding the marginal edge of test disk in place. The internal diameter of the sleeve 50 may be about 1⅜″, or sufficient to permit the ready application of a standard sediment test filter disk 53 of cotton fiber filter material, and of an overall diameter of one and one-fourth inches.

Adapted to be seated upon the disk and held thereon by suction, as will appear hereinafter, is a rubber plug or gasket 56 of a diameter closely approaching the internal diameter of the sleeve 50. Such plug has a standard central aperture 58 of 0.40 inch diameter, which will be aligned with the aperture 54 when the plug is seated on the filter disk 53. The plug 56 is inserted in the end of a tubular header, 60 which may be suitably plugged at its other end as at 62. The header is provided with a side port 64 leading to a plug type valve 66, having a nipple 68 to which a plastic hose 70 is attached, the other end of which (not shown) may be inserted into a milk pail or other vessel containing milk to be tested.

The upper end of the tubular member 20 is provided with a port 80 leading to a valve 82 having a nipple 84, to which may be attached a hose 86, which is attached to a source of vacuum, preferably another container which acts as a trap and vacuum reservoir, at a subatmospheric pressure of about 15 inches of mercury. Such vacuum may be the vacuum supply of the milking machines, or any other source of adequate volume.

The valve 82 is of the plug type having a through port 88 and side port 90, the valve body having a vent 92 so that the tubular member or graduate 20 may be connected to vacuum, as indicated in the sectional view, FIGURE 2, or to atmosphere, when the valve is turned to the position shown in FIGURE 3.

The procedure to be followed in using the apparatus first consists in setting the apparatus, which has been thoroughly cleaned, over the open end 42 of a milk can or the like, while connecting the vacuum hose to a source of vacuum with the valve 82 in the off position as indicated in FIGURE 3. A fresh sediment test disk 53 is applied to the filter disk seat 52, the header 60 inserted into the sleeve 50 and the gasket seated on the disk, and with the valve 66 closed. The chamber 20 may then be placed under vacuum by turning the valve 82 to the position shown in FIGURE 2, which promptly closes the flap valve 34. The free end of the hose 70 is then inserted into a milk pail of freshly delivered milk from one cow of the herd. Suction within the chamber 20 will hold the header and its gasket sealed upon the filter disk 53. With the apparatus set up in the manner described, the valve 66 is opened, whereupon fresh milk is drawn into the chamber 20, through the filter disk 53. The filter disk will remove sediment, but allow milk to flow through from a normal cow. When the milk level, reaches the graduation 9, flow is stopped by closing valve 66. Thereafter vacuum valve 82 is shifted to the position shown in FIGURE 3, which allows the flap valve 34 to open, quickly emptying the chamber into the milk can or other vessel. Such milk has not been harmed in any way, assuming the apparatus was sanitary to begin with and may be poured into the milk supply. In fact it has been improved by the removal of sediment and other deleterious substances as will appear hereinafter.

With the vacuum cut off, the header is removed, and the sediment test disk 53 removed, the disk showing on its upper surface the sediment gathered per pint of milk, for comparison with a standard sediment grading or chart.

During the foregoing procedure, the milk drawn into the chamber 20 may have been less than the full pint, as indicated by the full pint graduation 9, despite the existence of an ample quantity from which the specimen is drawn and maintained vacuum within the chamber, flow through the sediment test disk 53 having been blocked by the accumulation and presence on its upper surface of leucocytes in the form of slime, clots or pus. In practice the sediment test disk 53 may have been blocked by accumulated leucocyte before the milk has risen to the graduation 2, or flow may have stopped when the milk rose to the level indication 3 or 6 or 8 as the case may be. If a full pint as indicated by the rise in level to graduation 9 is not attained, within a few seconds, and flow through the sediment test disk is blocked, the cow from which such milk was taken should be marked for examination, and such examination will substantially in all cases confirm the fact that the milk from the cow in question should be kept from contaminating the supply from healthy cows. Such cow may be given antibiotics or other treatment to cure the condition, failing which removal from the herd may be necessary.

When a full pint is readily drawn from the milk given by a given cow, and flow is stopped by closing the valve 66, the leucocyte count for the milk of that cow will most generally be found to be sufficiently low as to be classed as normal milk.

While a vacuum of 15 inches of mercury has been referred to, the operation of the apparatus in supplying the results does not appear to be dependent on any fixed degree of vacuum, and will provide the desired indication on almost any range of vacuum as found in the dairy barn to operate the milking apparatus. If desired for comparative purposes, a vacuum pressure regulator can be placed in the vacuum line to hold the vacuum at a fixed subatmospheric pressure. It will be seen that the parts are readily disassembled for cleaning to maintain sanitation.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention. For example, while use of vacuum as a convenience is referred to, any differential pressure causing flow through the test disk could result in the blocking effect indicative of an abnormal leucocyte count.

What is claimed is:
1. Apparatus for indicating excessive leucocyte count in milk comprising an elongate graduate including means for visually observing the level of milk therein, from the outside and adapted to hold in excess of a test quantity of milk in the order of a pint, means connected to the upper end of the graduate for applying differential pressure therein, a dump valve connected to the lower end of the graduate, closure means for the upper end of the graduate having a test aperture and a surrounding seat to receive a cotton fiber filter disk, and means for conducting milk to the aperture comprising an annular seal adapted to engage the marginal portion of a filter disk on said seat, and having an aperture in alignment with the test aperture for suction through a filter disk disposed on the seat.

2. Apparatus as set forth in claim 1 wherein the differential pressure means comprises vacuum applying means includes a valve having provision for cutting off the vacuum and venting the graduate and the dump valve is held closed by vacuum within the graduate.

3. Apparatus as set forth in claim 1 wherein the disk seat is surrounded by an outstanding cylindrical sleeve, and the means for conducting the milk to the filter disk comprises a resilient gasket of a diameter to be readily received within the sleeve and bear against the filter disk, and the gasket has an aperture corresponding to and adapted for alignment with the seat aperture.

4. Apparatus as set forth in claim 1 wherein the disk seat is surrounded by an upstanding cylindrical sleeve, and the means for conducting the milk to the filter disk comprises a resilient gasket of a diameter to be readily received within the sleeve and bear against the filter disk, and the gasket has an aperture corresponding to and adapted for alignment with the seat aperture and in which the gasket forms a closure member in a chamber having a valved inlet for controlling the flow of milk into the graduate.

References Cited

UNITED STATES PATENTS

| | | | |
|---|---|---|---|
| 2,225,984 | 12/1940 | Erekson | 73—61 |
| 2,276,841 | 3/1942 | Hanson | 73—61 |
| 2,435,578 | 2/1948 | Ferraez | 73—61 |
| 2,786,445 | 3/1957 | Golay | 119—14.05 |
| 2,954,640 | 10/1960 | Catalano et al. | 137—525.1 |
| 3,085,425 | 4/1963 | Roman | 73—61 |

FOREIGN PATENTS 187,735  11/1956  Austria.

ALDRICH F. MEDBERY, *Primary Examiner.*